United States Patent [19]

Feller

[11] 4,348,906
[45] Sep. 14, 1982

[54] ACOUSTIC FLOW SENSORS

[75] Inventor: Murray F. Feller, Citrus County, Fla.

[73] Assignee: Wilgood Corporation, Jacksonville, Fla.

[21] Appl. No.: 176,904

[22] Filed: Aug. 11, 1980

[51] Int. Cl.³ .............................................. G01F 1/00
[52] U.S. Cl. ................................................ 73/861.77
[58] Field of Search .......... 73/861.21, 861.22, 861.23, 73/861.25, 861.72, 861.77, 861.84; 324/166

[56] References Cited

U.S. PATENT DOCUMENTS

| | | | |
|---|---|---|---|
| 3,217,539 | 11/1965 | Owen et al. | 73/861.77 |
| 3,241,366 | 3/1966 | Allen | 73/861.84 |
| 3,301,052 | 1/1967 | Lee et al. | 73/861.84 |
| 3,710,622 | 1/1973 | Hammond et al. | 73/861.84 |
| 3,756,078 | 9/1973 | Yamasaki et al. | 73/861.23 |
| 3,759,096 | 9/1973 | White | 73/861.22 |
| 3,881,352 | 5/1975 | McShane | 73/861.23 |
| 3,898,883 | 8/1975 | Kozak et al. | 73/861.77 |
| 3,934,473 | 1/1976 | Griffo | 73/861.84 |
| 4,012,958 | 3/1977 | Taylor | 73/861.77 |
| 4,019,373 | 4/1977 | Freeman et al. | 73/644 |
| 4,286,470 | 9/1981 | Lynnworth et al. | 73/861.18 |
| 4,305,281 | 12/1981 | Lee et al. | 73/861.84 |

FOREIGN PATENT DOCUMENTS

| | | | |
|---|---|---|---|
| 231518 | 3/1959 | Australia | 73/290 V |
| 2081224 | 3/1971 | France | 73/861.77 |
| 706708 | 12/1979 | U.S.S.R. | 73/861.77 |

*Primary Examiner*—Stuart S. Levy
*Assistant Examiner*—David V. Carlson

[57] ABSTRACT

In the disclosed apparatus, flow of fluid in a pipe is sensed by directing acoustic signals at a fluid-metering rotor in the pipe. One or more transducers are used for emitting an acoustic signal and receiving acoustic reflections. A flow-representing signal is derived that varies with the attitude of the rotor in relation to the transducer(s).

9 Claims, 6 Drawing Figures

U.S. Patent   Sep. 14, 1982   4,348,906
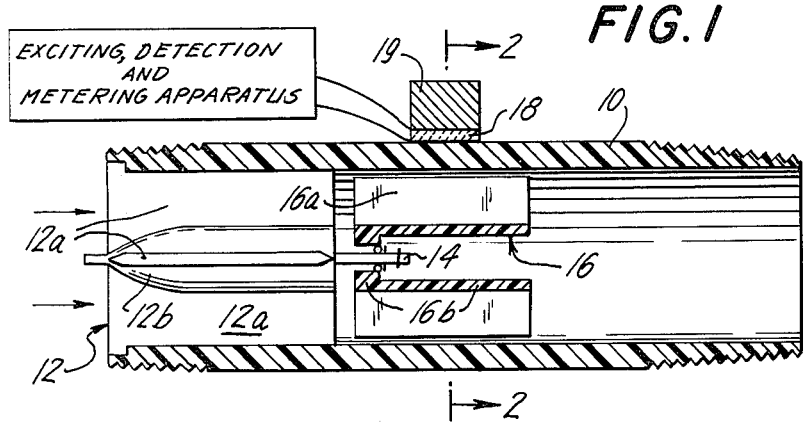
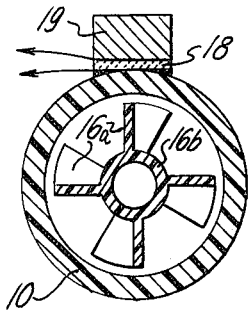
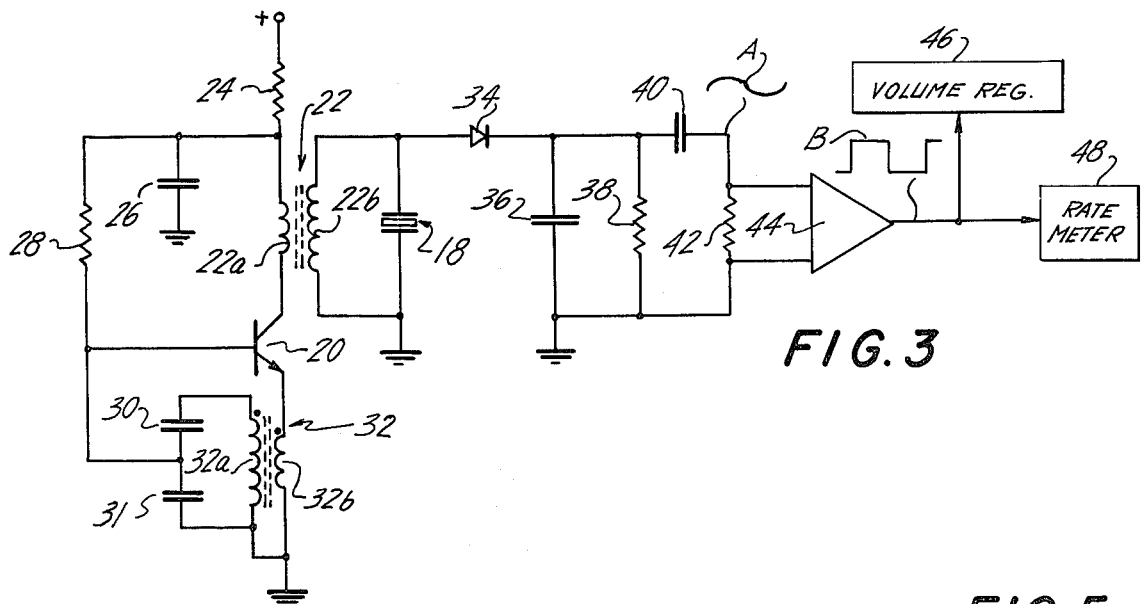
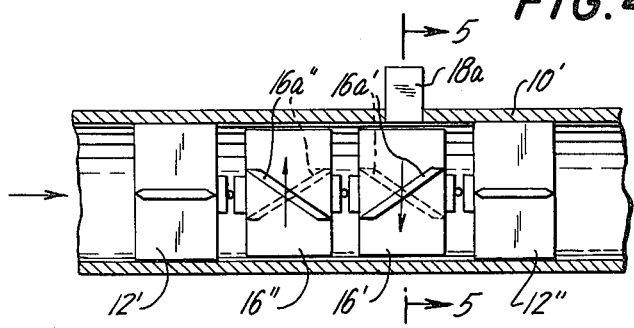
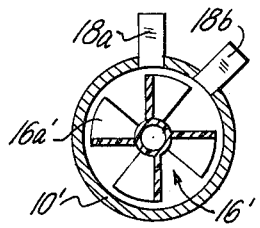
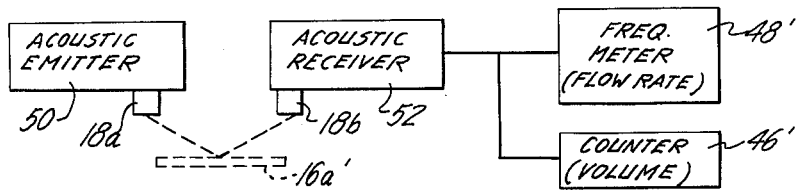

ACOUSTIC FLOW SENSORS

The present invention relates to a method and apparatus for sensing the flow of fluid, especially liquid, in a pipe.

BACKGROUND OF THE INVENTION

In measuring the volume and/or rate of flow of fluids, a vaned rotor is commonly mounted in the flow passage, designed to rotate accurately in proportion to the volume of flow of fluid, especially liquid, over a wide range of flow rates. Where the rotor is used to provide mechanical drive force to operate the gearing of a register, the resulting loading of the rotor introduces inaccuracy that is particularly notable at low flow rates. Rather than to rely on the rotor to provide mechanical drive for a register, sensors have been located close to the rotor to generate flow-representing signals. For example, magnets have been mounted on the flow-metering rotor, arranged to induce pulses in a sensing coil that is mounted in a plug sealed in the wall of the pipe, close to the rotor magnets. Electrodes exposed to water adjacent a turbine rotor provide flow sensing in copending application Ser. No. 06/150,142, filed May 15, 1980, by the present inventor. These and other flow sensors are known.

A so-called turbine rotor is commonly used as the metering element in the flow passage. The rotor axis may be centered in a pipe, or the turbine rotor may be mounted as a probe, having a rotor of small diameter in a much larger-diameter passage, with the rotor axis parallel to the direction of flow. Probe-type metering elements of the "paddle-wheel" type are also known, in which the rotor has blades coplanar with the rotor axis at right angles to the direction of flow. Wobble-type flow metering elements are also known. In each instance, the metering element operates in cycles to represent, ideally, a metered volume of flow per cycle. Metering elements characteristically have a vane or other discrete portion that moves cyclically past or opposite to a spot where a magnetic pick-up or other sensor may be located so as to yield one pulse or wave each time a discrete portion of the metering element passes the sensor.

Other types of flow sensors are known which depend on an interaction between a sensor and anomalies in the fluid. One such flow sensor responds to the interaction between the liquid in a passage and a supersonic acoustic signal source. Those flow sensors omit the flow-metering element in the other flow sensors that are briefly described above.

SUMMARY OF THE INVENTION

The illustrative embodiments of the present invention relate to the kind of flow sensors in which a flow-metering element is used. One or more acoustic transducers are disposed opposite the flow-metering element to emit an acoustic signal (carrier) toward the flow-metering element. In the illustrative embodiments, the flow metering element is a turbine-type rotor having its axis parallel to the direction of flow and having vanes extending from a hub at slant angles to radial planes containing the rotor axis. A (the) transducer emits an acoustic carrier toward the flow-metering element and the same or another transducer acts as a receiver in responding to the carrier signal as reflected by the flow-metering element. The received signal is both phase-modulated as compared to the emitted signal and it is amplitude-modulated. Both forms of modulation are taken into account where a single transducer is used for the emitting and receiving functions. The received signal is complex, but through adjustment the demodulating process can be optimized. For example, the carrier frequency can be adjusted for greatest variation in strength of the demodulated signal as different aspects of the rotor are opposed to the transducer(s).

Piezoelectric elements serve as transducers in these flow sensors, being small and inexpensive, and rugged, dependable and durable. Where an acoustic carrier in the audio frequency range is used with a turbine-type rotor, a warble can be heard as the rotor turns.

The novel flow sensors are remarkably non-critical as to the relationship between the rotor and the pipe. No close tolerances or critical spacing of the transducer(s) and the flow-metering element is involved.

Of particular value is the form of construction involving transducer(s)—especially the piezoelectric type—bonded to the external surface of the pipe. In that case, mounting the transducer(s) does not involve the danger of a leak developing, or of weakening the wall of the pipe, or of subjecting the transducer(s) to damaging exposure to liquid. Where plastic pipe is used, the wall of the pipe represents a series impedance of limited effect in the emitted-and-received path of the acoustic signal. Both audible and supersonic frequencies can be used. Metal pipe represents excessive impedance where a carrier of audible frequency is used (e.g. 2 to 5 kHz), but the apparatus is practical with the transducer(s) mounted externally on metal pipe and with a high-frequency acoustic carrier signal, e.g. 300 kHz. (These illustrative values have been found effective for pipes of one inch internal diameter.)

Accordingly, an object of the invention resides in providing a new kind of flow sensor and a new method of flow sensing, having one or more of the foregoing features.

A more specific object of the invention resides in providing a novel flow sensor including a flow-metering element in the fluid passage, wherein a flow-representing signal is produced by transducer means on the exterior of the wall that defines the fluid passage.

The foregoing and other objects, features and advantages of the invention will be more fully appreciated from the following detailed description of the illustrative embodiments and the accompanying drawings which form part of the disclosure of the embodiments there shown.

BRIEF DESCRIPTION OF THE DRAWING

FIG. 1 is a longitudinal cross-section of the mechanical portion of an illustrative embodiment of the invention;

FIG. 2 is a cross-section of the embodiment of FIG. 1 at the plane 2—2;

FIG. 3 is an illustrative embodiment of a circuit forming part of the embodiment of FIG. 1;

FIG. 4 is a longitudinal cross-section of flow-sensing apparatus in another embodiment of the invention that includes further novel features;

FIG. 5 is a transverse cross-section of the apparatus of FIG. 4 at the plane 5—5; and FIG. 6 is a block diagram of the circuit forming part of the embodiment of FIG. 4.

THE ILLUSTRATIVE EMBODIMENTS

In FIGS. 1–3, section of pipe 10 defines a passage for flow of fluid, especially a liquid such as water. At the inlet end (designated by the arrows) there is a combined flow-straightening and bearing unit 12 including vanes 12a in radial planes and a hub 12b. Shaft 14 is fixed axially in hub 12b and extends into the hub 16b of vaned rotor 16. Shaft 14 thus supports rotor 16 for rotation about the axis of pipe 10, with its vanes 16a separated by a non-critical clearance from pipe 10. Vanes 16a are distributed at 90° intervals about the central axis (FIG. 2) and they are disposed at a suitable angle, e.g. 30°, to the idealized path of the fluid along the pipe, parallel to its axis (compare FIG. 4) so that the flowing fluid tends to rotate the rotor proportional to the flow rate.

In an example, pipe 10 is of polyvinyl chloride, being thereby supple in the sense of being readily deformable in contrast, comparatively, to iron-walled pipe. Stated differently, the wall of plastic pipe 10 can be used as an acoustic signal coupler between transducer 18 outside the pipe and the fluid inside the pipe.

Transducer 18 serves as an acoustic signal emitter when subjected to suitable electrical excitation at the acoustic signal frequency. It also serves as an acoustic signal receiver, when connected in an appropriate circuit such as that in FIG. 3. An excellent form of transducer is a small plate of piezo-electric material such as barium titanate or barium zirconate. In an example, plates of 0.2 to 0.3-inch square and 0.010 to 0.020-inch thick have been used successfully as an acoustic signal emitter and receiver, operating with suitable electrical excitation at a frequency approximately (typically) in the range 2 to 5 kHz. The actual frequency is adjusted to produce one prominent pulse or wave in the demodulated signal output per rotor vane passing the transducer. Metal electrodes are bonded to the opposite faces of the piezoelectric plate for applying the electric excitation. The transducer is securely united to the outer surface of the plastic pipe as by a thin layer of suitable bonding material. The bonding material serves as a means for coupling the piezoelectrically induced vibrations of the transducer to the wall of the pipe. In an example, a polyvinyl-chloride pipe was used having a wall thickness of approximately $\frac{1}{8}$ inch and an inside diameter of approximately one inch. This construction has the distinctive advantage of avoiding a hole through the wall of the pipe, and it has none of the problems identified with holes such as the weakening effect on the pipe, the difficulty of sealing the transducer in the hole, protecting the transducer from damage that might be caused by the fluid, etc. The bonding material serves as a direct acoustic coupling layer. A purely mechanical assembly of the float piezoelectric plate to the cylindrical surface of the pipe would involve air spaces and would impair the acoustic coupling in the accoustic path from the piezoelectric plate and back. A mass of material at the rear of piezoelectric plate 18 diagrammatically represented by metal block 19 provides inertia that enhances the acoustic coupling to plate 18. Block 19 may be part of a mechanical clamp (not shown) that may be used for more securely mounting plate 18 on the pipe. Transducer 18 is located midway along the rotor and the transducer is much shorter than the rotor, measured parallel to the axis of the rotor. This arrangement assures ample acoustic reflection from the vanes, taking into account the oppositely sloping attitudes of two successive vanes as viewed from the location of transducer 18.

Transducer 18 is shown connected in a circuit (FIG. 3) enabling it to serve both as an acoustic signal emitter and as an acoustic signal receiver. Transistor 20 has its emitter connected to the d-c supply through a series-connected primary winding 22a of a step-up output transformer 22 and resistor 24 which is by-passed to ground (d-c negative) by filter capacitor 26. Transistor 20 is in a grounded-emitter circuit. Its base is connected through resistor 28 to resistor 24. The base is also connected to the junction of series-connected capacitors 30 and 32 that are in parallel with the high-impedance winding 32a of transformer 32 whose low-impedance winding 32b is connected between the emitter and ground.

The circuit thus far described forms a well-known oscillator. Its output is coupled to transducer 18 which is connected across the high impedance secondary winding 22b of the oscillator's output transformer 22.

Transducer 18 thus emits acoustic signals, closely coupled to the wall of pipe 10. The interaction of the acoustic signal and the rotor depends on the position of rotor 16. At times (as in FIG. 2) the rotor directs a vane toward the transducer. At other times the rotor presents a pocket to the transducer. The pocket is defined by two vanes 16a that slope in opposite directions (as viewed from the location of the transducer) and by the hub 16b. Rotor 16 is formed of a grade of nylon that is resistant to absorption of water when the apparatus is used to sense or meter the flow of water. In any case, the wall of the pipe opposite transducer 10 applies acoustic vibrations to the fluid which, upon reaching the various areas of the rotor, are reflected in complex paths toward transducer 18. Vanes 16a may be 0.050 inch thick and of nylon that has a yielding quality compared to iron, but the rotor is prominently reflective in contrast to the non-reflective property of fluids. Calculations indicate that, with the dimensions and frequencies given above, the distance from the transducer to the hub and return to the transducer result in an emission-and-return path in water which is of the order of half a wavelength with sinewave excitation, in an eminently successful example having a pipe of one inch inside diameter and an excitation frequency of 2–2.5 kHz. Much higher excitation frequencies can be used successfully with the same form of the apparatus where iron-walled pipe is used. The length of the emission-and-reflection path then becomes many wavelengths long, as an approximation. In any case, the signal reflected by rotor 16 and picked up by transducer 18 is both amplitude-modulated and phase-modulated as compared to the emitted acoustic signal.

In the circuit of FIG. 3, an amplitude-modulation detector circuit includes diode rectifier 34 with shunt capacitor 36 in parallel with resistor 38. The demodulated signal A is coupled by series capacitor 40 and load resistor 42 to high-gain amplifier 44. Signal A is illustrated diagrammatically, actually being a complex wave having a prominent basic component that corresponds to the frequency at which the vanes pass transducer 18 ("the vane frequency"). The output of amplifier 44 is a square wave B of the vane frequency. It is utilized by various output means, such as volume register 46 that counts and accumulates the number of square waves (or a sub-multiple) and a rate-of-flow meter 48. The same signal may also be used as input to a BTU meter wherein units of flow are multiplied by the temperature difference between inlet and outlet temperatures.

The form of rotor and pipe in FIGS. 1 and 2 with acoustic transducer 18 may be modified for economy when much larger flow rates are to be monitored, where the pipe is enlarged appropriately. A small rotor-and-transducer like that in FIGS. 1 and 2 but omitting pipe 10 may be carried on a radial support as a probe, optionally centered in the enlarged pipe. In that case, transducer 18 and its leads should be suitably isolated electrically and protected (if necessary) against damaging exposure to the fluid, as by non-rigidly encapsulating the transducer.

FIGS. 4-6 represent an embodiment of the invention having many features in common with that of FIGS. 1-3 and features not found in FIGS. 1-3. In FIGS. 4-6, a plastic-walled pipe can be used with transducers like the arrangement in FIG. 1. However, in FIGS. 4-6, an iron-walled pipe 10' is shown, having holes through its wall in which transducers 18a and 18b are sealed. These transducers are suitably protected from damaging exposure to be fluid as by a fluid-tight acoustic layer bonded to the transducer over its electrodes.

Flow-straightener 12' at the fluid inlet has vanes 12a' in radial planes that bear against the inside surface of pipe 10' and provide a support for one end of a bearing shaft whose opposite end is carried in support 12" similarly having vanes in radial planes, bearing against the inside surface of pipe 10'.

An idler rotor 16" is rotatably pivoted immediately downstream of flow straightener 12'. Rotor 16' (conveniently called the "active" rotor) is rotatably supported immediately downstream of idler rotor 16". Rotors 16' and 16" are both of the same construction as rotor 16, except that the equally slanted vanes of rotors 16' and 16" slope oppositely. At moderate and high flow rates, rotor 16' rotates proportionally to the flow rate, just as it would if no idler rotor 16" were interposed between straightener 12' and rotor 16'. However, at low flow rates bearing friction of rotor 16' tends to introduce inaccuracy. Friction tends to cause slower-than-proportional rotation of the rotor. This is actually what occurs in the case of idler rotor 16". This frictional drag of rotor 16" causes the fluid leaving its vanes to have a slight spin, in the direction to produce a compensating increase in the speed of active rotor 16'. In this way, the active rotor retains accurate proportionality of its rotation to fluid flow at very low flow rates.

In FIG. 5, the four rotor vanes 16a' are shown spaced from each other equally by 90°. Acoustic emitter 18a and acoustic receiver 18b may both be piezoelectric transducers like transducer 18 described above. Transducers 18a and 18b are separated less than 90°, centered at axes spaced apart 45°, for example. In this way, two contrasting conditions develop alternately. In one condition, these transducers have an emission-reflection-reception path or space identified with a pocket of the rotor, the space bounded by two successive vanes and any surface portion of the hub between the vanes. In the second condition, a vane of the rotor is positioned between transducers 18a and 17b, and thus obstructs the transmission space between the transducers. Separation of the acoustic emitting and receiving functions has the advantage of enhancing separate performance of the separate transducers as compared to the case (FIG. 3) of both functions being performed by a common transducer, and the further advantage of affording a coupling space that is intermittently obstructed. Also where separate emitting and receiving transducers are used, they can be arranged in relation to a rotor vane and to each other for optimum effect. A single transducer can be made to operate well and avoids the added expense of a second transducer and its assembly as part of the flow sensor.

In FIG. 6, acoustic emitter 50 includes transducer 18a and all of the oscillator circuit 22–32 of FIG. 3, while acoustic receiver 52 includes transducer 18b and all of the detector circuit 34–44 of FIG. 3, supplying demodulated signal to volume register 46' and rate meter 48' and any other apparatus that may utilize the output signal such as a BTU meter.

It has been indicated above that the acoustic transducers may be mounted externally on the wall of the pipe not only when the pipe is of a supple material such as plastic, but externally mounted transducers can also be used successfully on a metal pipe, using a much higher acoustic frequency, as 300 kHz. The audible-frequency systems shown and described have many practical advantages.

In describing the operation of the illustrative embodiments, a theory is adopted of signal emission toward the rotor and reflection to the signal-receiving transducer. That theory seems sound, but the invention does not depend on the validity of that theory. Instead, especially as to the apparatus in FIGS. 4 and 5, a contributing and possibly dominating factor may be the varying degrees of direct signal transmission from one transducer to the other or attenuation of that transmission, depending on the disposition of the rotor vanes.

It is evident from the foregoing that features of the described illustrative embodiments have distinct merit. However, the novel concepts are readily incorporated in a variety of different structures, and the illustrative embodiments are subject to many changes as will be apparent to those skilled in the art. Consequently, the invention should be construed broadly, in accordance with its full spirit and scope.

What is claimed is:

1. A flow sensor including a wall defining a fluid-flow passage, a flow-metering rotor supported in said passage for rotation by fluid flowing therein and having means including rotor-operating vanes defining multiple pockets, and means cooperating with the pocket-defining means of said flow-metering rotor for producing sustained flow-representing signals that are modulated in dependence on the relationship of the signal producing means to said pocket-defining means, said last-named means including acoustic signal transducer means coupled to said pocket-defining means via the fluid in the passage for emitting an acoustic carrier signal into the region of the fluid-flow passage in which the flow-metering rotor operates, said flow-metering rotor and said transducer means being related to each other for causing the emitted signal to be received as a modulated signal in dependence on varying disposition of the pockets of said rotor relative to said transducer means.

2. A flow sensor in accordance with claim 1 wherein said transducer means comprises an acoustic signal emitter and an acoustic signal receiver.

3. A flow sensor in accordance with claim 1 wherein said transducer means comprises a unitary signal emitter and receiver.

4. A flow sensor in accordance with claim 1 wherein said flow-metering rotor has a rotational axis along the direction of fluid flow, wherein the rotor has a hub, the vanes extending from the hub and defining successive pockets, and wherein said transducer means is disposed to direct the emitted acoustic carrier signal toward said rotor generally transverse to both the direction of fluid flow and the hub.

5. A flow sensor in accordance with claim 4 wherein said transducer means comprises an acoustic signal emitter and an acoustic signal receiver displaced from said signal emitter so that at times the rotor provides a pocket thereof as an acoustic signal transmission space between said emitter and said receiver while at other times a vane of the rotor is interposed as an acoustic signal decoupler in the transmission path between the emitter and the receiver, thereby enabling the rotor to modulate the acoustic transmission between said emitter and said receiver.

6. A flow sensor in accordance with claim 4 wherein said transducer means comprises a unitary acoustic signal emitter and receiver which, depending on the rotor position, is at times directed toward a pocket of said rotor identified with successive rotor vanes and at other times is directed into two successive pockets of the rotor divided by a rotor vane, thereby enabling the rotor to modulate the acoustic signal transmission from said transducer and back to the transducer.

7. A flow sensor in accordance with any one of claims 1-6, wherein said transducer means comprises piezoelectric material having opposed electrodes thereon.

8. A flow sensor in accordance with any one of claims 1-6 wherein said transducer means comprises piezoelectric material having opposed electrodes thereon and the exterior of said wall bears said transducer means, whereby said wall forms an acoustic coupling element between the transducer means and said flow-metering rotor.

9. A method of producing signals representing the flow of fluid in a passage, including the steps of disposing a flow-metering rotor having vanes defining a series of pockets in the path of the fluid for operation thereby, emitting an acoustic carrier from a fixed position toward the pockets of the rotor, at a fixed position receiving the carrier modulated by the shifting pockets of the rotor, and from the received signal deriving a signal representing the operation of the flow-metering rotor.

* * * * *